US010018152B2

(12) United States Patent
Pascal et al.

(10) Patent No.: US 10,018,152 B2
(45) Date of Patent: Jul. 10, 2018

(54) TURBOJET ENGINE NACELLE INCLUDING A THRUST REVERSING DEVICE WITH DOORS, INCLUDING INNER FLANKS ON THE SIDES OF AN OPENING

(71) Applicant: AIRCELLE, Gonfreville l'Orcher (FR)

(72) Inventors: Sébastien Laurent Marie Pascal, Epouville (FR); Alexandre Breton, Versailles (FR)

(73) Assignee: AIRCELLE, Gonfreville l'Orcher (FR)

( * ) Notice: Subject to any disclaimer, the term of this patent is extended or adjusted under 35 U.S.C. 154(b) by 254 days.

(21) Appl. No.: 14/950,564

(22) Filed: Nov. 24, 2015

(65) Prior Publication Data

US 2016/0076485 A1    Mar. 17, 2016

Related U.S. Application Data

(63) Continuation of application No. PCT/FR2014/051279, filed on May 28, 2014.

(30) Foreign Application Priority Data

May 29, 2013 (FR) ...................... 13 54878

(51) Int. Cl.
*F02K 1/72* (2006.01)
*F02K 1/60* (2006.01)
(Continued)

(52) U.S. Cl.
CPC ................. *F02K 1/72* (2013.01); *F02K 1/60* (2013.01); *F02K 1/62* (2013.01); *F02K 1/70* (2013.01);
(Continued)

(58) Field of Classification Search
CPC ..... F02K 1/72; F02K 3/06; F02K 1/70; F02K 1/60; F02K 1/62
(Continued)

(56) References Cited

U.S. PATENT DOCUMENTS 3,567,128 A * 3/1971 Urquhart ................... F02K 1/60
60/232
3,874,620 A    4/1975 Kahler et al.
(Continued)

FOREIGN PATENT DOCUMENTS

EP        0301939      2/1989
EP        0574730      12/1993
(Continued)

OTHER PUBLICATIONS

International Search Report dated Oct. 9, 2014 in International Application No. PCT/FR2014/051279.

*Primary Examiner* — Ted Kim
(74) *Attorney, Agent, or Firm* — Burris Law, PLLC

(57) ABSTRACT

A turbojet engine nacelle includes a thrust reversing device having doors that swing to brake a direct gas flow, guiding it through counter-thrust openings, and the inside of each door has, at the front, a cavity receiving a spoiler turned towards the front when this door is open. The nacelle includes a fixed structure upstream from each door supporting a deflection edge that partially covers the cavity. In particular, the fixed structure supports, on each side, counter-thrust openings, a flank disposed in the continuation of the deflection edge and extending behind the cavity, which is incorporated into a leaf of the door.

7 Claims, 2 Drawing Sheets

(51) Int. Cl.
*F02K 1/62* (2006.01)
*F02K 1/70* (2006.01)
*F02K 3/06* (2006.01)

(52) U.S. Cl.
CPC .......... *F02K 3/06* (2013.01); *F05D 2220/323* (2013.01); *F05D 2250/14* (2013.01); *F05D 2250/70* (2013.01)

(58) Field of Classification Search
USPC .............................. 60/226.2, 230; 244/110 B
See application file for complete search history.

(56) References Cited

U.S. PATENT DOCUMENTS

| | | | | |
|---|---|---|---|---|
| 4,147,027 A | * | 4/1979 | Greathouse | F02K 1/60 60/230 |
| 4,182,501 A | * | 1/1980 | Fage | F02K 1/60 60/230 |
| 4,894,985 A | * | 1/1990 | Dubois | F02K 1/70 60/226.2 |
| 4,922,712 A | * | 5/1990 | Matta | F02K 1/70 60/230 |
| 5,392,991 A | * | 2/1995 | Gatti | F02K 1/60 60/232 |
| 5,716,025 A | * | 2/1998 | Meyer | F02K 1/70 60/230 |
| 5,775,097 A | * | 7/1998 | Lardy | F02K 1/60 60/230 |
| 5,836,149 A | * | 11/1998 | Servanty | F02K 1/60 60/230 |
| 5,875,995 A | * | 3/1999 | Moe | F02K 1/70 60/230 |
| 8,783,010 B2 | * | 7/2014 | Guillois | F02K 1/70 239/265.19 |
| 2010/0064659 A1 | | 3/2010 | Wang et al. | |

FOREIGN PATENT DOCUMENTS

| | | |
|---|---|---|
| FR | 2526872 | 11/1983 |
| FR | 2813103 | 2/2002 |
| GB | 2287920 | 10/1995 |
| WO | 2008/142243 A1 | 11/2008 |

\* cited by examiner

TURBOJET ENGINE NACELLE INCLUDING A THRUST REVERSING DEVICE WITH DOORS, INCLUDING INNER FLANKS ON THE SIDES OF AN OPENING

CROSS-REFERENCE TO RELATED APPLICATIONS

This application is a continuation of International Application No. PCT/FR2014/051279, filed on May 28, 2014, which claims the benefit of FR 13/54878, filed on May 29, 2013. The disclosures of the above applications are incorporated herein by reference.

FIELD

The present disclosure relates to an aircraft turbojet engine nacelle, including a thrust reversing device with doors.

BACKGROUND

The statements in this section merely provide background information related to the present disclosure and may not constitute prior art.

The motorization assemblies for aircrafts generally include a nacelle forming a globally tubular external casing, comprising on the inside a turbojet engine disposed along the longitudinal axis of this nacelle.

The turbojet engine receives fresh air from the upstream or front side, and rejects from the downstream or rear side the hot gases originating from fuel combustion, which provide a certain thrust. For the dual flow turbojet engines, fan blades disposed around the turbojet engine generate a secondary flow importing cold air along an annular stream passing between the motor and the nacelle, which adds a high thrust.

For a braking of the aircraft, a type of known nacelle introduced in particular by documents FR-A1-2813103 and WO-A1-2008/142243, includes at the rear of the nacelle doors which swing into an open position so as to largely close the passage of the air flow towards the rear. The doors thus deflect this flow radially outwards by passing via transversal counter-thrust openings open by their deployment, in order to push them towards the front while generating an inverted thrust.

Each door swinging around a transversal axis disposed towards the rear, at its front side which lifts towards the outside of the nacelle so as to show its internal surface facing the flow. This flow is first deflected by this internal surface which is terminated at the front end by a deflector comprising a spoiler forming a substantially right angle, so as to produce a second deflecting of the air flow allowing to project it as much as possible towards the front to improve braking efficiency.

In addition, the air output flow rate by the open doors during thrust reversing must be sufficient so as not to damage the turbojet engine.

Furthermore, when the door is closed, its internal surfaces should form for the annular stream of cold air, the best aerodynamic continuity so as to facilitate the stream of this flow towards the rear, to provide the turbojet engine with the best propulsion output.

For this, the document WO-A1-2008/142243 has a front end spoiler of the door, comprising a substantially radial orientation when the door is closed, which disposes of a mechanism generating a fold so as to retract it in this door and free the passage. However, this mechanism adds a complexity, and may cause failures.

SUMMARY

The present disclosure proposes a turbojet engine nacelle including a thrust reversing device comprising doors which swing to brake the flow of direct gas by guiding it through counter-thrust openings so as to send this flow back towards the front, the inside of each door comprising at the front a cavity receiving a spoiler turned towards the front when this door is open, the stationary structure upstream of each door supporting a deflecting edge which partially covers the cavity, characterized in that the stationary structure supports on each side of the counter thrust opening, a flank disposed in the continuation of the deflecting edge and extending to the rear of the cavity, which is integrated within a groove of the door.

An advantage of this turbojet engine nacelle is that the flanks constitute simple, efficient and low-cost means for at the same time improving the passage of the direct flow by covering the cavity on the sides of the counter-thrust openings, and improving the passage of the reverse flow by guiding the gases on these sides of these openings.

Thus, it improves at the same time the outputs for the direct jet thrust towards the rear in normal operating, and for the counter-thrust due to the reverse jet when braking.

The turbojet engine nacelle according to the present disclosure may further include one or several of the following features, which may be combined together.

Advantageously, the internal faces of the flanks are disposed substantially along the continuous theoretical surface of the direct flow duct which gives a better aerodynamic profiling, thus improving output for this flow.

Particularly, along the longitudinal axis of the nacelle, the length of the flank can represent around twice the width of the cavity.

Advantageously, the cavity includes a straight bottom, which starting from the rear, moves away from the continuous theoretical surface radially towards the outside according to a small angle, thus providing a better guiding of the flow in thrust reversing.

Particularly, this small angle may range between 10 and 20°.

Advantageously, the deflecting edge includes a curvature turned radially outwards, of which the profile in an axial plane substantially comprises an elliptical portion, so as to achieve a better compromise between the guiding of the direct flow, and the output of the reverse flow by the counter-thrust opening allowing a high output flow rate.

Particularly, the ratio of the minor radius to the major radius of the elliptical portion may range between 0.28 and 0.35.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
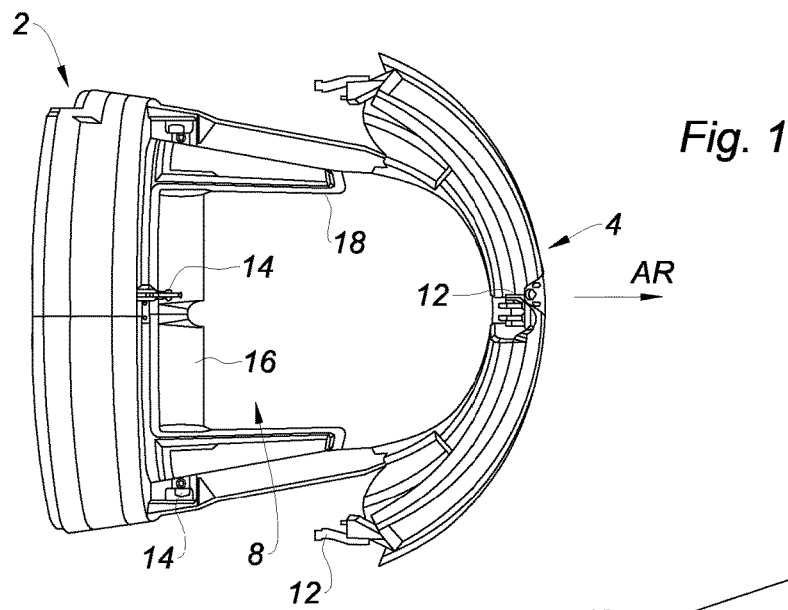
FIG. 1 is a top view of the rear part of a nacelle according to the present disclosure, comprising an upper open door.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
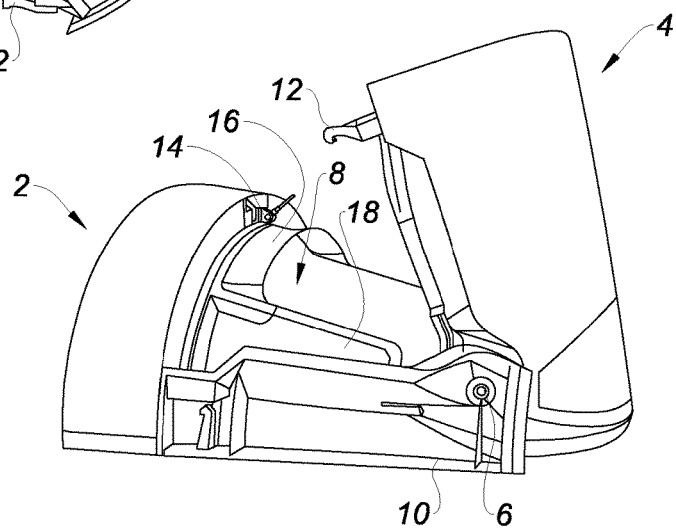
FIG. 2 is a side view of the upper part of this nacelle.
Figure 3:
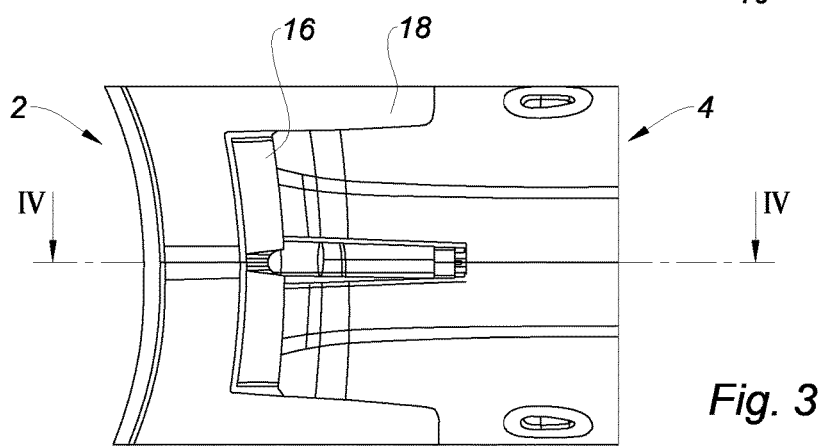
FIG. 3 is a bottom view showing the closed door and the stationary structure which is at the front.

FIGS. 1 to 3 have a stationary circular structure 2 at the rear of a nacelle provided for receiving a turbojet engine disposed along a main axis, which rejects for the propulsion of the aircraft a flow of gas towards the rear indicated by arrow "AR".

The stationary structure 2 is symmetrical along a plane of symmetry passing by the axis, which is presented in the various figures as being horizontal. In the aircraft, this plane may have any inclination whatsoever.

Each side of the stationary circular structure 2 includes a lateral arm 10 extending towards the rear, supporting at the end thereof in the upper part a transversal pivot 6 securing the rear part of a cowl 4.

The cowl 4 may swing around its two transversal pivots 6 by lifting the front part thereof, as presented on FIGS. 1 and 2, on the one hand for substantially closing the flow of gas coming from the turbojet engine and the annular stream surrounding it, and on the other hand deflecting this flow towards the top by passing via a transversal counter-thrust opening 8 cleared by this swinging, so as to send it at least partially towards the front.

The front of the cowl 4 includes at the center and on each side a hook 12 being secured in a lock 14 connected to the circular structure 2, when this cowl is closed.

The cowls 4 being closed, the annular stream includes an external form given by the inner surface of the circular structure 2, which is extended by the inner surfaces of these cowls, comprising an aerodynamic profiling. A deflecting edge 16 extends the rear part of the circular structure 2, by advancing in the counter-thrust opening 8.

The stationary circular structure 2 supports on each side of the counter-thrust opening 8, a flank 18 disposed in the continuity of the deflecting edge 16. Each flank 18 extends towards the rear, inside the lateral arm 10. The cowl 4 being closed, each edge of this cowl becomes adjusted between the flank 18 and the lateral arm 10.

For the nacelle according to the present disclosure, the forms of the deflecting edges 16 and flanks 18 are adjusted in order to obtain a compromise giving improved outputs at the same time for the direct streaming of the gases providing the propulsion of the aircraft, and for the reverse streaming providing the braking thereof, while in this case allowing a sufficient output flow rate so as to inhibit damage to the turbojet engine.

Figure 4:
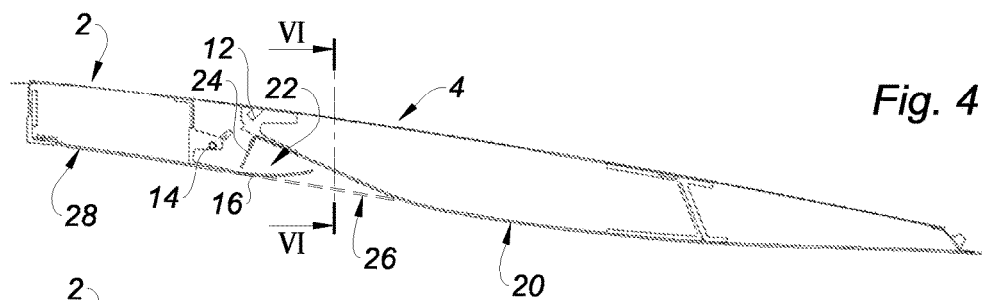
FIG. 4 is a longitudinal half-section along the vertical sectional plane IV-IV, showing the closed door and the stationary structure in front of this door.

FIG. 4 shows the inner surface 20 of the door 4 which is globally in the extension of the inner surface 28 of the circular structure 2, along an ideal theoretical continuous surface 26.

However, the inner surface 20 of the door 4 includes at the front a cavity 22 comprising a straight bottom which by starting from the rear, spaces away from the theoretical continuous surface 26 radially towards the outside, according to a small angle.

The cavity 22 terminates towards the front by a spoiler 24 turned towards the axis of the nacelle when the door 4 is closed, and forming a right angle, which ideally may also range between 70° and 100°, with the bottom of this cavity, which is entirely integrated within the cavity so as not to go beyond this theoretical surface 26.

When the door 4 is open, the flow of gas passing by the counter-thrust opening 8 is deflected towards the front in particular by the bottom of the cavity 22 and the spoiler 24, which comprise improved forms for obtaining a better flow deflection.

The small angle of the bottom of the cavity 22 must be sufficiently low for providing when the door 4 is open, a guiding of the flow along the inner surface 20 of this door without too much separation of this flow, in order to obtain a better counter-thrust output. On the other hand, this angle should be sufficiently large to have a sufficiently long spoiler 24 so as to improve the deflection towards the front of the flow in open door position and so as to form a cavity, the axial length of which is relatively small, so as to limit the direct flow disruptions providing propulsion. Advantageously, this small angle ranges between 10 and 20°.

The deflecting edge 16 extends towards the rear in front of the cavity 22 to largely cover it when the door 4 is closed, the rear part of this deflecting edge comprising after the spoiler 24, a curvature gradually turned radially towards the outside which slightly enters into the cavity. The purpose of this rear curvature is to promote the streaming of the gases radially towards the outside by the counter-thrust opening 8 when the door 4 is open, while remaining quite close to the theoretical continuous surface 26 so as not to inhibit the passage of direct flow towards the rear.

In an axial plane, the profile of the rear curvature advantageously includes an elliptical portion, of which the ratio of the minor radius to the major radius ranges between 0.28 and 0.35.

Figure 5:
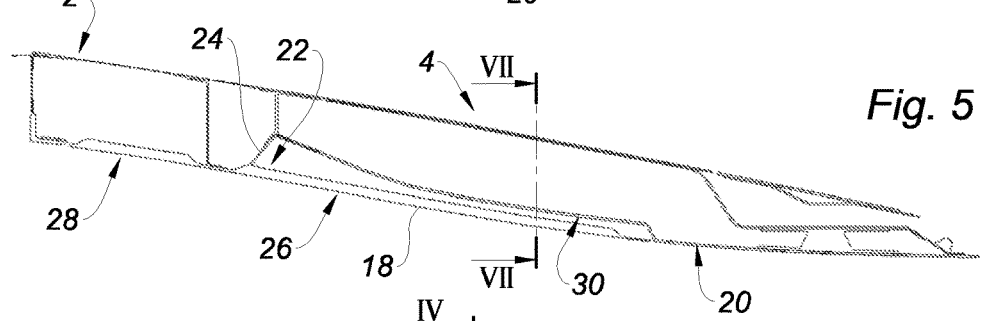
FIG. 5 is a longitudinal half-section along the slanting sectional plane V-V, showing the door closed and the stationary structure in front of this door.
Figure 6:
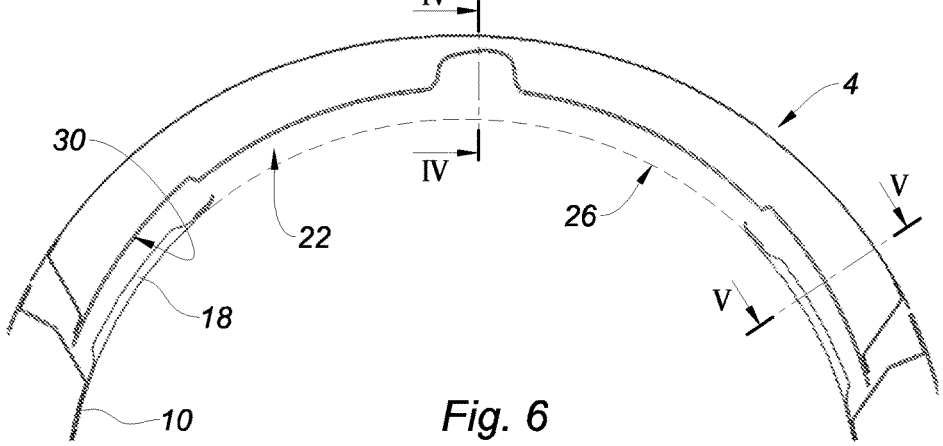
FIG. 6 is a transversal half-section along the sectional plane VI-VI, passing by the cavity, the door being closed.
Figure 7:
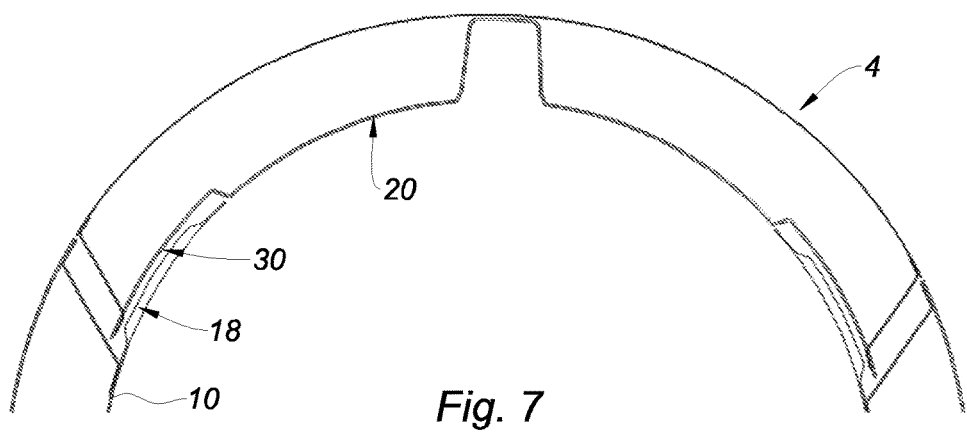
FIG. 7 is a transversal half-section along the sectional plane VII-VII, passing behind the cavity, the door also being closed.

FIGS. 5 to 7 show the door 4 comprising the cavity 22 and the spoiler 24 thereof which extend towards the two sides of this door, so as to obtain a spoiler acting on the entire width of the door to give the best deflection of the flow towards the front.

In order to guide the direct propulsion flow, the cavity 22 is covered on each side of the counter-thrust opening 8, by the flank 18 which noticeably extends towards the rear of this cavity. The flanks 18 constitute lateral panels which limit on the sides the counter-thrust opening 8, and guide the flow towards the outside when the door 4 is open.

It is worth noting that along the longitudinal axis, the length of the flank 18 represents about twice the width of the cavity 22.

To integrate each flank 18 in the door 4 so as to produce an inner face of this flank disposed substantially along the theoretical continuous surface 26, the door comprises a groove 30 which integrates the thickness of this flank.

It is worth noting that the transversal section shown on FIG. 6 being achieved at the cavity 22, the flanks 18 are spaced apart from the bottom of this cavity, whereas the section shown on FIG. 7 being achieved behind this cavity, these flanks are just about integrated within the groove, near the door 4.

In this manner, it is obtained in a simple manner and without any mechanism, an improved output for the direct flow, thanks to the flanks 18 integrated in the grooves 30 which provide a guiding of this flow in front of the cavities 22 by covering them, and the specific curved profile of the deflecting edge 16, and the reduced length of the cavity 22 thanks to the break of the inner door 4 surface 20 sufficiently in front of the door 4. The output of the reverse flow is also improved thanks to better guiding of this flow radially towards the outside by these flanks 18, and by this deflecting edge profile 16.

In addition, the improving of the guiding of the reverse flow by means of the deflecting edge 16 allows a better output flow rate by the counter-thrust openings 8, thereby inhibiting damage to the turbojet engine.

What is claimed is:

1. A turbojet engine nacelle including a thrust reversing device comprising doors which swing relative to a stationary structure of the nacelle to brake a flow of direct gas by guiding the flow of the direct gas through counter-thrust openings so as to send the flow of the direct gas back towards a front when the doors are open, an inside of each door comprising at the front a cavity receiving a spoiler turned towards the front when a door is open, a stationary structure upstream of each door supporting a deflecting edge which partially covers the cavity, the stationary structure further comprising on each side a lateral arm extending rearwardly and supporting a transversal pivot securing a rear part of a cowl, wherein the stationary structure supports on each side of the counter thrust openings, a flank disposed in a continuation of the deflecting edge and extending to a rear of the cavity inside the lateral arm, said flank being integrated within a groove of the doors and each edge of each door becomes disposed between the flank and the lateral arm when the doors are closed, the deflecting edge including a curvature turned radially outwards.

2. The turbojet engine nacelle according to claim 1, wherein an internal face of the flank is disposed substantially along a continuous theoretical surface of a direct flow duct, which has an aerodynamic profiling.

3. The turbojet engine nacelle according to claim 1, wherein a length of the flank along a longitudinal axis of the nacelle is about twice a width of the cavity.

4. The turbojet engine nacelle according to claim 1, wherein the cavity includes a straight bottom, which starting from the rear, moves away from a continuous theoretical surface radially towards an outside at a small angle.

5. The turbojet engine nacelle according to claim 4, wherein the small angle ranges between about 10 and 20°.

6. The turbojet engine nacelle according to claim 1, wherein a profile of the deflecting edge in an axial plane substantially comprises an elliptical portion.

7. The turbojet engine nacelle according to claim 6, wherein a ratio of a minor radius to a major radius of the elliptical portion ranges between approximately 0.28 and 0.35.

* * * * *